United States Patent
Pudelski et al.

[11] Patent Number: 5,885,944
[45] Date of Patent: Mar. 23, 1999

[54] LOW CHLORINE POLYALKYLENE SUBSTITUTED CARBOXYLIC ACYLATING AGENT COMPOSITIONS AND COMPOUNDS DERIVED THEREFROM

[75] Inventors: John K. Pudelski, South Euclid; Matthew R. Sivik, Parma; Kurt F. Wollenberg, Chardon; Richard Yodice; Jerry L. Rutter, both of Mentor; Jeffry G. Dietz, University Heights, all of Ohio

[73] Assignee: The Lubrizol Corporation, Wickliffe, Ohio

[21] Appl. No.: 646,783

[22] Filed: May 21, 1996

[51] Int. Cl.[6] .......................... C10M 135/00; C10L 1/24
[52] U.S. Cl. .......................... 508/306; 549/247; 549/251; 549/255; 208/262.1; 44/304; 44/351
[58] Field of Search .......................... 508/306; 549/251, 549/255; 208/262.1

[56] References Cited

U.S. PATENT DOCUMENTS

| | | | |
|---|---|---|---|
| 3,231,587 | 1/1966 | Rense | 549/255 |
| 3,234,131 | 2/1966 | Morway | 508/306 |
| 3,288,714 | 11/1966 | Osuch | 508/306 |
| 3,303,203 | 2/1967 | Meinstein | 549/251 |
| 3,407,216 | 10/1968 | Egbert | 549/251 |
| 3,954,812 | 5/1976 | Puskas et al. | 549/255 |
| 4,235,786 | 11/1980 | Wisotsky | 549/255 |
| 4,240,916 | 12/1980 | Rossi | 508/306 |
| 4,282,157 | 8/1981 | van der Voort | 549/255 |
| 4,560,772 | 12/1985 | Telschow et al. | 549/240 |
| 4,564,687 | 1/1986 | Telschow | 549/240 |
| 5,041,622 | 8/1991 | LeSuer | 549/255 |
| 5,420,207 | 5/1995 | Greif et al. | 549/255 |
| 5,489,390 | 2/1996 | Sivik et al. | 252/58 |

FOREIGN PATENT DOCUMENTS 495560  8/1953  Canada .................. 549/251

*Primary Examiner*—Ellen M. McAvoy
*Attorney, Agent, or Firm*—William J Connors

[57] ABSTRACT

Polyalkylene substituted carboxylic acylating agents which contain chlorine are synthesized by chlorine induced condensation of polyalkylenes and α-β unsaturated carboxylic groups are treated with sulfur to reduce chlorine content of the carboxylic acylating agent.

20 Claims, 1 Drawing Sheet

LOW CHLORINE POLYALKYLENE SUBSTITUTED CARBOXYLIC ACYLATING AGENT COMPOSITIONS AND COMPOUNDS DERIVED THEREFROM

FIELD OF INVENTION

This invention relates to the synthesis and use of low chlorine content polyalkylene substituted carboxylic acylating agent compositions. The primary use of the compositions are to form reaction products with alcohols, polyamines, metals and the like, which products when used in minor amounts in lubricating fluids impart improved dispersing and viscosity properties to such fluids.

BACKGROUND OF THE INVENTION

It is by now well-known that carboxylic acylating agents produced by polyalkylene reactions with carboxylic-containing compounds when further reacted with (a) an amine having at least one H—N< group; (b) an alcohol; (c) reactive metal or reactive metal compound and (d) a combination of any two or more of (a)–(c), the components of (d) being reacted simultaneously or sequentially produce compositions having dispersing, fluidity or detergency properties or combinations thereof depending on the nature of the composition. In depth discussion of these compositions, their properties and modes of preparation and post treatments are discussed in detail in U.S. Pat. Nos. 4,234,435; 5,041,622; and 5,230,714 which are herein incorporated by reference in their entirety, including references cited therein, for disclosure and examples and enablement related to this invention.

In the patents mentioned herein-above and references given therein, disclosure is made of reacting polyalkylenes with carboxylic-containing groups in the presence of chlorine to obtain substituted acylating agents. For such reactions conducted in the presence of bromine and/or chlorine, halogen is incorporated into the substituted acylating agent. A method of producing a chlorine free substituted acylating agent is to use a high vinylidene polyalkylene to react with maleic anhydride under thermal conditions without chlorine. High vinylidene polybutylenes and substituted acylating agents derived therefrom are described in U.S. Pat. Nos. 4,152,499; 4,605,808; and 5,071,919 which are herein incorporated by reference. However, high vinylidene polyalkylenes are more expensive than polyalkylene such as polyisobutylene derived from acid catalyzed polymerization of a $C_4$-raffinate of a cat cracker or ethylene plant butane/butene stream, so there is a continued interest in using a chlorine-containing process to react polyalkylenes with maleic anhydrides to form polyalkylene substituted acylating compositions.

SUMMARY OF THE INVENTION

Polyalkylenes derived from $C_2$–$C_{16}$ olefins are reacted with unsaturated carboxylic acids or derivatives thereof in the presence of chlorine to form chlorine-containing substituted carboxylic acylating agents. The chlorine-containing substituted acylating agents are further reacted with elemental sulfur at elevated temperatures whereby the chlorine content in the substituted acylating agent is reduced.

A further aspect of this invention is that new compositions of matter, including polyalkylene phthalic anhydrides are formed. The substituted phthalic anhydrides having reduced chlorine content are thermally stable components of the sulfur treated substituted acylating agent.

Reaction products from sulfur treated substituted acylating agents contain sulfur and have an increased kinematic viscosity at 100° C. when compared to substituted acylating agents prior to sulfurization.

DETAILED DESCRIPTION OF THE INVENTION

Figure 1:
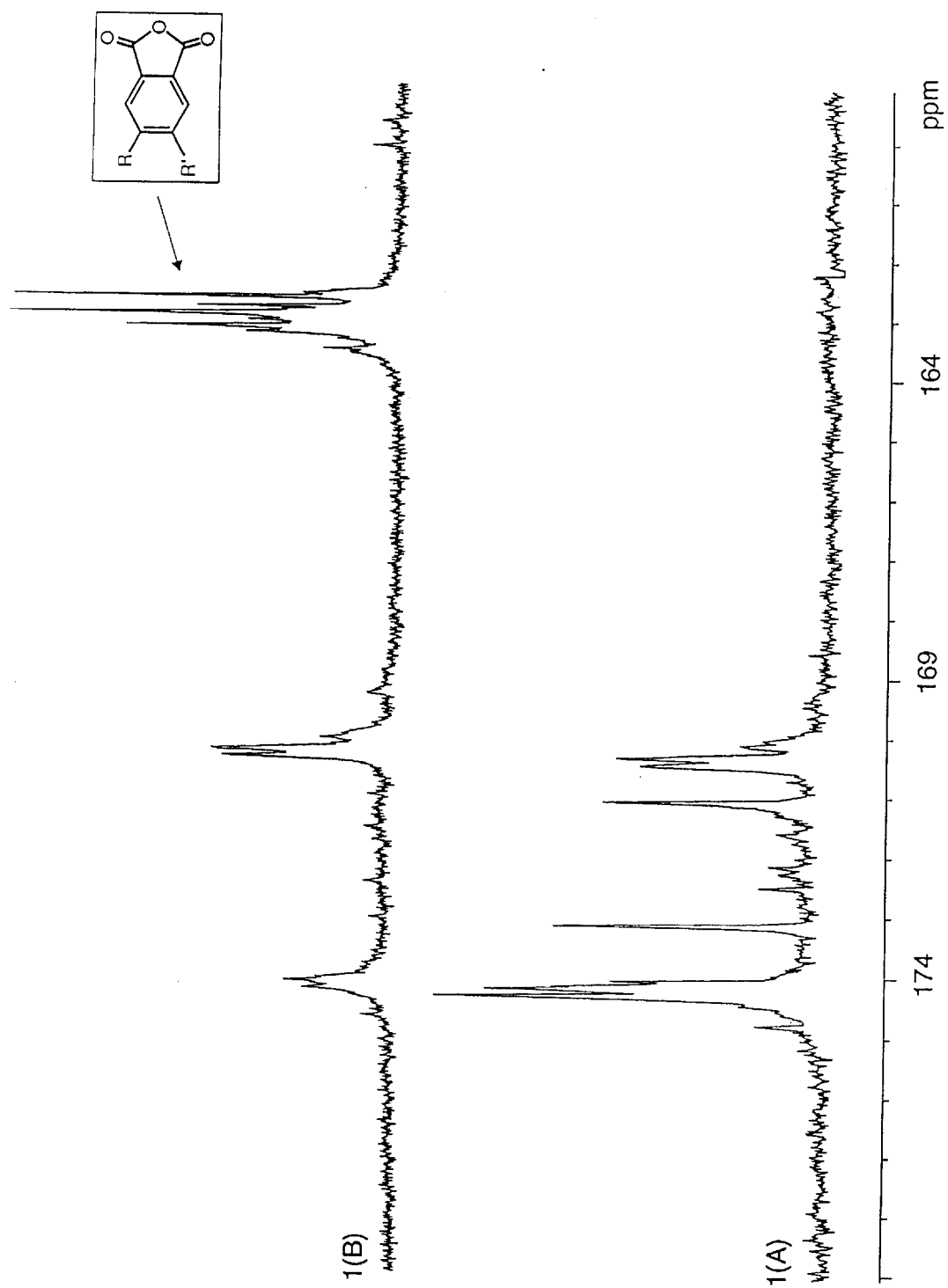

In the present invention, a polyalkylene derived from a $C_2$–$C_{16}$ polyolefin is reacted in the presence of chlorine with a α-β unsaturated mono or dicarboxylic acid or derivatives such as maleic anhydride or acrylic acids or esters to form chlorine-containing polyalkylene substituted "carboxylic" acylating agents. Said di-carboxylic acylating agents are also known as succinic acylating agents. In general, this well known reaction is depicted in Formula I below for maleic anhydride.

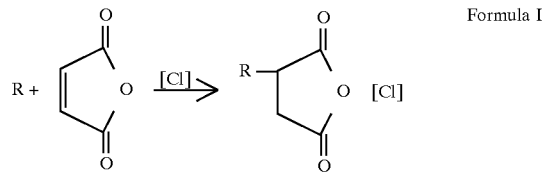

Formula I

In the invention disclosed herein, R is preferably Mn 140–10,000 polyalkylene. R is more preferably low vinylidene polyisobutylenes which are commercially available. In the reaction labeled Formula I above maleic anhydride is depicted as the carboxylic agent to condense with the polyalkylene to give a substituted succinic compound.

It should be understood in the scope of this invention that maleic anhydride compounds are representative of those compounds as such, but also represent a class of acidic compounds depicted by Formula II

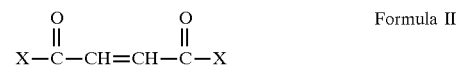

Formula II which react with polyalkylenes under the influence of chlorine.

In Formula II what is required is that X and X' are the same or different provided at least one of X and X' is such that the substituted acylating agent can function as carboxylic acylating agents. That is, at least one of X and X' must be such that the substituted acylating agent can esterify alcohols, form amides or amine salts with amines or ammonia, form metal salts with reactive metals or basically reacting metal compounds, and otherwise function as a conventional carboxylic acid acylating agents. Transesterification and transamidation reactions are considered, for purposes of this invention, as conventional acylating reactions.

Thus, X and/or X' is usually —OH, —O, -hydrocarbyl, —Cl, and together X and X' can be —O so as to form the anhydride. The specific identity of any X or X' group which is not one of the above is not critical so long as its presence does not prevent the remaining group from entering into acylation reactions. Preferably, however, X and X' are each such that both carboxyl functions of the succinic group (i.e., both

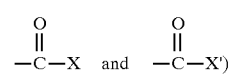

can enter into acylation reactions. The preferred compounds as depicted by Formula II are maleic acid, maleic anhydride and mixtures thereof. However, in the claims appended hereto, maleic acid and anhydride represent these chemicals as such, but also all other applicable compounds which have been described hereinabove in connection with Formula II.

It must also be understood that the maleic term used above for compounds depicted by Formula II and which are described above also is used herein to describe compounds of FIG. II in which one

group is replaced by a hydrogen or hydrocarbyl group. Such compounds are α-β unsaturated monocarboxylic acids or ester such as acrylic acid. For a definition of hydrocarbyl, see U.S. Pat. No. 5,354,485 which is incorporated herein by reference for disclosure of hydrocarbyl groups.

The reaction depicted in Formula I shows chlorine as being a part of the reaction. As is well known in the art, the polyalkylene substituent may be chlorinated before being reacted with the maleic anhydride. The alkylation reaction may also be run by mixing the polyalkylene and maleic component and adding chlorine to the mixture. The important point is that the preferred method for forming the substituted acylating agent from α-β unsaturated acids and anhydrides and polyalkylenes with low vinylidene content is to use chlorine in the reaction whereby some chlorine is retained in the substituted acylating agent.

Methods of preparing the chlorine-containing substituted succinic acylating agents also identified herein as chlorine containing substituted carboxylic acylating agents are given in U.S. Pat. No. 5,489,390 which is hereby incorporated herein by reference in its entirety. As pointed out in the '390 patent, several methods may be used to prepare the chlorinated succinic acylating agent.

The methods involve the two-step process as described in U.S. Pat. No. 3,219,666. In this patent, which is incorporated herein by reference the polyalkylene is first reacted with chlorine and the chlorinated polyalkylene is reacted with maleic anhydride.

Another method of producing the succinic acylating agent is described in U.S. Pat. No. 3,912,764 which is herein incorporated by reference. In this method, the polyalkylene is condensed with maleic anhydride under thermal conditions to produce "direct alkylation". Following direct alkylation chlorine is added to the reaction mixture to promote reaction of unreacted maleic anhydride.

U.S. Pat. No. 3,231,587, which is incorproated herein by reference described the "one step" process for making succinic acylating agents. In this process, the polyalkylene and maleic anhydride are mixed then contacted with chlorine.

The novel class of substituted succinic acylating agents of this invention are those which can be characterized by the presence within their structure of two groups or moieties. The first group or moiety is referred to herein, for convenience, as the "substituent group(s)" and is derived from a polyalkylene. The polyalkylene from which the substituted groups are derived is characterized by a Mn (number average molecular weight) value of from 140 to about 10,000 and a Mw/Mn value of about 1.5 to about 4. More preferably, the polyalkylene may be a $M_n$ 1000–2000 polyisobutylene.

The second group or moiety is referred to herein as the "succinic group(s)" or "carboxylic groups", both of which names are used herein. The succinic groups are those groups characterized by the structure in Formulas I and II and have been discussed herein above.

The substituted succinic acylating agents are characterized by the presence within their structure of at least 1.0 succinic groups (that is, groups corresponding to Formulas I and II) for each equivalent weight of substituent groups. For purposes of this invention, the number of equivalent weights of substituent groups is deemed to be the number corresponding to the quotient obtained by dividing the Mn value of the polyalkylene from which the substituent is derived into the total weight of the substituent groups present in the substituted succinic acylating agents. Thus, if a substituted succinic acylating agent is characterized by a total weight of substituent group of 40,000 and the Mn value for the polyalkene from which the substituent groups are derived is 2000, then that substituted succinic acylating agent is characterized by a total of 20 (40,000/2000=20) equivalent weights of substituent groups. Therefore, that particular succinic acylating agent must also be characterized by the presence within its structure of at least 20 succinic groups to meet one of the requirements of the novel succinic acylating agents of this invention.

The chlorine content of the substituted acylating agents of this invention will normally run to less than one percent by weight based on the weight of the acylating agent but the value can range as high as 2–3 weight percent and as low as 0.5 weight percent or less depending on the specific reaction conditions. Low chlorine is preferred in products in which said acylating agents or compounds derived therefrom are included.

In one aspect of the invention described herein, the reaction products of a polyalkylene with maleic anhydride is treated with sulfur at elevated temperatures to reduce the chlorine content of the substituted acylating agent. In this manner, the chlorine content of the reaction products shown in Formula I can be reduced by at least 50% or even up to 75% or even more depending on the given reaction products and the process used to reduce chlorine.

Formula I symbolizes the well-known reaction of a polyalkylene and maleic anhydride in the presence of chlorine to form a substituted acylating agent with a given chlorine content. However, by use of carbon $^{13}$C nuclear magnetic resonance spectroscopy, a more accurate depiction of the reaction products is formed.

By use of $^{13}$C NMR, it has been found that the chlorine containing processes for condensing a polyalkylene with maleic anhydride results in products as shown below in Formula III as well as the "normal" reaction product substituted acylating agents shown in Formula I.

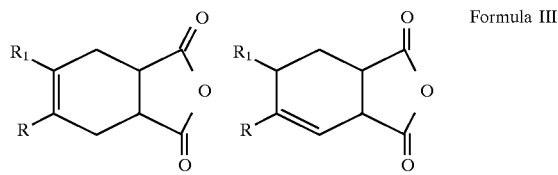

Formula III $R_1$ = $CH_3$, H
R = polyalkylene

Polyalkylene substituted
tetrahydrophthalic anhydrides and

Polyalkylene substituted
disuccinic carboxylic acylating agents

The chlorine containing substituted tetrahydrophthalic anhydrides and substituted disuccinic acylating agent from Formula III form significant amounts of the reaction products. The disuccinic carboxylic acylating agent is a tetracarboxylic acid or anhydride. It is thought that these products are formed by Diels-Alder condensation of a "diene" derived from the polyalkylene substituent and an "ene" derived from the maleic anhydride substituent. The reaction products, of course, contain chlorine. In the chlorine-containing reaction products, from Formula III, the substituted tetrahydrophthalic acylating agent may be present in an amount of up to 65 tetrahydrophthalic containing units per 100 substituent groups. That is, of the polyalkylene groups being condensed with maleic anhydride to form a polyalkylene substituted maleic anhydride, up to 65 per 100 polyalkylene groups may contain the tetrahydrophthalic substituent group. The disuccinic component of the reaction mixture may contain up to 30 groups per 100 polyalkylene groups in the reaction products. The disuccan reaction product has at least two groups derived from the α-β unsaturated moiety per polyalkylene group.

NMR Experiments $^{13}$C Nuclear Magnetic Resonance (NMR) spectra were recorded on either Bruker AMX 500 (125.6 MHz) or Bruker ARX 300 (75.4 MHz) instruments. Samples were dissolved in deuterated chloroform (CDCl$_3$) with typical concentrations of 1.5–2.0 g/5 mL. Spectra were referenced to internal tetramethylsilane (TMS) at 0.0 ppm.

$^1$H NMR spectra were recorded on either Bruker AMX 500 (500 Mhz) or Bruker ARX 300 (300 Mhz) instruments. Samples were dissolved in CDCl$_3$ with typical concentrations of 1.5–2.0 g/5 mL. Spectra were referenced to internal TMS at 0.0 ppm.

FIG. 1 demonstrates spectral characteristics of reaction products formed by reacting sulfur with the reaction products of Formulas I and III. Trace 1(A) shows the $^{13}$C NMR spectra for the carboxy region for the reaction products of a M$_n$ 1000 polyisobutylene with maleic anhydride in the presence of chlorine. The trace for the products from reacting sulfur with the products of 1 (A) at 210° C. is shown in 1(B). The tracing at 210° C., 1(B), shows nearly complete conversion of the tetrahydrophthalic component to the aromatized phthalic component. Conversion at 190° C. was not complete. While any amount of sulfur may be employed to dechlorinate and dehydrogenate the tetrahydrophthalic compound to form its aromatized counterpart, it has been found that at least two equivalents or more of sulfur per equivalent of tetrahydrophthalic component give the highest conversion of tetrahydro component to the aromatic component with liberation of two equivalents of H$_2$S. This is the preferred sulfur usage for aromatization.

The time used in the reactions shown in FIG. 1 was 4.5 hours but up to 12 hours or longer may be preferred. The sulfurization of the substituted tetrahydrophthalic component of the reaction products leads to the phthalic compound through dehydrogenation. The disuccinic component of the reaction products is largely unaffected. Thus in calculating sulfur charge for the dehydrogenation reaction, only the amount of the substituted tetrahydrophthalic component of the reaction products should be considered.

The highest polyalkylene substituted phthalic anhydride yields which were obtained resulted from sulfurization of a succan prepared by the Two-Step reaction of M$_n$ 1000 polyisobutylene. This finding can be rationalized by the observation that the Two-Step Process yields greater amounts of tetrahydrophathalic anhydrides than our One-Step Process. The Two-Step/Sulfurization sequence is described below.

Two-Step Reaction of M$_n$ 1000 Polyisobutylene

A mixture of M$_n$ 1000 polyisobutylene in 20% (m/m) cyclohexane is reacted with 1.1 equivalents of chlorine at 65° C. The cyclohexane is removed by distillation and the resulting polyisobutylene chloride is reacted with 1.1 equivalents of maleic anhydride at 200° C. for 24 hrs. Excess/unreacted maleic anhydride is removed by vacuum stripping.

| Product Analyticals: | |
|---|---|
| SAP | 93.7 |
| % Unreacted | 12.6 |
| % Unreacted malan | 0.155 |
| AgNO$_3$ % chlorine | 0.297 |

Sulfurization of the Two-Step Product

The product from above is reacted with 1 sulfur/CO (or 2 sulfur/anhydride) at 210° C. for 6 hours. $^{13}$C NMR indicates that 72% of the product carbonyl groups are attributable to substituted phthalic anhydride groups as compared to about 50% for sulfur treatment of products from the one-step reaction of polyisobutylene with maleic anhydride described later herein in Example 1.

| Product Analyticals: | |
|---|---|
| SAP | 96.8 |
| AgNo$_3$ % chlorine | 0.032 |
| % sulfur | 0.97 |

In addition to the formation of the phthalic moiety during the reaction of sulfur with reaction products formed by the chlorine catalyzed condensation of polyalkylenes with maleic anhydrides, products of increased viscosity are also obtained. This, of course, is in addition to a lowering of the chlorine content caused by sulfur treatment of the chlorine containing substituted acylating agents. Sulfur treatment causes sulfur to be incorporated into the sulfurized substituted acylating agents in the amount as high as 2–3 weight percent. It is thought that sulfur coupling or crosslinking may be the cause of the viscosity value increase.

While it has been found as part of this invention that sulfur at elevated temperatures reduces the chlorine content of the substituted acylating agent reaction products, it has also been found that given treatments of the reaction products in conjunction with sulfur can reduce the chlorine content even further. These treatments include reacting the chlorinated reaction products with iodine prior to reacting with sulfur. Iodine treatment of chlorine containing substituted acylating agents in combination with Lewis acid to reduce chlorine is described in U.S. Pat. No. 5,489,390 which is herein incorporated by reference. The treatments of the instant invention to reduce chlorine also include reacting the chlorinated reaction products with a Lewis acid or mineral acid and sulfur in any order. Also included are reactions in which the chlorinated reaction products are treated with iodine and then with the mixture of sulfur and a Lewis acid or mineral acid. The preferred Lewis acid for use in the scope of this invention is zinc acetate. A wide variety of Lewis acids are useful in the process of the present invention. Various compounds of zinc, magnesium, calcium, iron, copper, boron, aluminum, tin and titanium are useful Lewis acids. Examples of zinc compounds useful as well as Lewis acids in the process of the present invention includes zinc acetate, zinc oleate, zinc bromide, zinc chloride, zinc iodide, zinc oxide and zinc sulfate. Examples of iron compounds include ferrous acetate, ferric acetate, ferrous bromide, ferric bromide, ferrous chloride, ferric chloride, ferrous iodide and ferric iodide. Examples of magnesium compounds include magnesium iodide and magnesium sulfate. Calcium compounds such as calcium iodide and calcium sulfate are useful. Examples of copper compounds include cuprous oxide, curprous chloride cupric acetate, cupric bromide, cupric chloride, cupric iodide, cupric oxide, cupric sulfate and cupric sulfide. Examples of boron compounds include boron trifluoride, boron trichloride, boron tribromide, trimethylborane, triethylborane, trimethylborate, triethylborate, triisopropylborate and tributylborate. Examples of aluminum compounds include trialkylaluminum compounds such trimethylaluminum, triethylaluminum and triisobutylaluminum; aluminum alkoxides such as aluminum isopropoxides, aluminum sec-butoxides and aluminum t-butoxides; aluminum halides such as aluminum fluorides, aluminum chlorides and aluminum bromides; and aluminum oxide. Examples of tin compounds include the stannous and stannic forms of tin acetate, tin bromide, tin chloride, tin iodide and tin sulfate. Examples of titanium compounds include titanium (IV) chloride, titanium (IV) isopropoxide, titanium (IV) isobutoxide and titanium (IV) ethoxide and titanium oxides. Any of the above Lewis acids may be converted to other Lewis acids under the process conditions. For example, zinc oxide may be converted to zinc chloride by reaction with chlorine or hydrogen chloride present in the organochlorine compound, or the zinc oxide may be converted to zinc iodide by reaction with the source of iodine added to the reaction mixture. Lewis acids may also be formed in situ by adding to the reaction mixtures, metals such as magnesium, aluminum, zinc, etc. Other examples of Lewis acids which may be utilized include tetraethylenetetracarboxylate and tetracyanoethylene.

Mineral acids, other than hydriodic acid and hydrobromic acid which may be utilized in the present invention include strong mineral acids such as sulfuric acid, nitric acid, phosphoric acid, pyrophosphorus acid, etc. The acid also may be a strong organic acid such as organic acids having a pKa of less than about 2. Examples of such acids include aliphatic and aromatic sulfonic acids such as methane sulfonic acid, trifluoromethyl sulfonic acid, benzene sulfonic acid, various p-alkylbenzene sulfonic acids, p-toluene sulfonic acid, and naphthalene sulfonic acid; carboxylic acids such as cyclopropane-1,1-dicarboxylic acid, nitroacetic acid, dichloroacetic acid, maleic acid, oxalic acid, picric acid, trichloroacetic acid, trifluoroacetic acid, trihydroxybenzoic acid; phenolic compounds such as trinitrophenol; and phosphonic acids such as phenyl phosphonic acid, methyl phosphonic acid and trifluoromethyl phosphonic acid.

The various combination of reactions which will lead to a low chlorine substituted acylating agent under this invention are combinations of I. Sulfur treatment of
   (A). chlorine containing polyalkylene substituted carboxylic acylating agent;
   (B). (A) treated with iodine;
   (C). (A) treated with iodine and Lewis acid;
   (D). (A) treated with iodine and mineral acids;

II. Sulfur and Lewis acid treatment of
   (A). chlorine containing polyalkylene substituted carboxylic acylating agent;
   (B). (A) treated with iodine;
   (C). (A) treated with iodine and Lewis acid;
   (D). (A) treated with iodine and mineral acid.

While elemental sulfur is the preferred chemical to effect removal of chlorine from chlorine containing substituted acylating agents, other types of sulfur containing chemicals may be used. For instance, organic sulfur donors may be used. Thiuram disulfides are represented by tetramethylthiuram disulfide. Also dipentamethylene-thiuram tetra and hexasulfides can be used to reduce chlorine. Also of use are 2-(4-morpholinodithio) benzothiazole and 4,4$^1$-dithiobismorpholine. It will be recognized that sulfur as well as organic sulfur donors mentioned above are vulcanizing agents used in the rubber industry but which are also useful in the present invention. Vulcanizing agents are often used with accelerators and such accelerators may be useful to this invention also. For a review of vulcanizing agents and accelerators, see Kirk-Othmer, *Encyclopedia of Chemical Technology*, 3rd Ed. 1982 pp. 337 and forward which is incorporated herein by reference.

Table 1 gives analytical data for a chlorine containing substituted acylating agent and for the acylating agent following various chemical treatments. The acylating agent is prepared by reacting polyisobutylenes of $M_n$ 1000 and $M_n$ 2000 with maleic anhydride and chlorine in the "one step" process.

EXAMPLE 1

Synthesis of Substituted Acylating Agents and Reaction with Sulfur (A) 1000 grams of a commercially available $M_n$ 1000 polyisobutylene (1 mole) is mixed with 108 grams maleic anhydride (1.10 mole) and the mixture heated to about 110° C. with stirring. To the stirred mixture over 6.5 hours is added 100 grams chlorine (1.4 moles) gas under the surface of the reaction mixture. The temperature is controlled between 110° C. and 190° C. Nitrogen may be blown through the reaction mixture to remove excess chlorine and maleic anhydride.

(B) 1000 grams of a commercially available $M_n$ 2000 polyisobutylene (0.5 mole) is reacted with 108 grams maleic (1.1 mole) anhydride and 1.4 mole chlorine gas as above. The difference between preparations 1(A) and 1(B) is that 1(B) has a higher degree of succination than 1(A).

(C) The products of 1(A) and 1(B) above are heated at 210° C. with sulfur under a nitrogen purge. Sulfur in the reaction mixtures is based on two equivalents of sulfur per equivalent of anhydride for chlorine reduction and dehydrogenation to form the phthalic component.

TABLE 1

Analytical Data for Treatment of Products from Examples 1(A) and 1(B)

| Item | 1 | 2 | 3 | 4 |
| --- | --- | --- | --- | --- |
| Prep Number | 1(A) | 1(A) | 1(A) | 1(A) |
| Treatment | — | no sulfur | 2 S/anhydride | 2 |

TABLE 1-continued

Analytical Data for Treatment of Products from Examples 1(A) and 1(B)

| Process | | 210° C., 4.5 h | 190° C., 4.5 h | S/anhydride 210° C., 4.5 h |
|---|---|---|---|---|
| D445_100 Kin Vis (cSt) | 1280 | 1123 | 1250 | 1900 |
| D1522 % Sulfur | ns | ns | 3.22 | 1.34 |
| AgNO$_3$ % Cl | 0.82 | 0.362 | 0.338 | 0.226 |

| Item | 5 | 6 | 7 | 8 |
|---|---|---|---|---|
| Prep Number | 1(A) | 1(A) | 1(A) | 1(B) |
| Treatment | 2 | 2.5 S/anhydride | 2 S/anhydride | 0.17 |
| Process | S/anhydride 210° C., 7.25 h | 210° C., 6 h | 205° C., 6 h 1500 g | S/anhydride 210° C., 6 hrs. |
| D445_100 Kin Vis (cSt) | 1750 | 1633 | 1700 | — |
| D1522 % Sulfur | 1.51 | 1.88 | 1.8 | — |
| AgNO$_3$ % Cl | 0.208 | 0.193 | 0.256 | 0.205 |

The notations used in the tables are as follows:
Prep Number—Product from Example 1
S/anhydride—equivalents of sulfur/equivalent of anhydride component
D445—100° C. kinematic viscosity based on cSt value
D1552—% sulfur in sample on a weight percent basis
AgNO$_3$ Cl %—% chlorine in sample on a weight percent basis
XRF Cl %—% chlorine in sample on a weight percent basis
XRF I %—% iodine in sample on a weight percent basis The information to be focused on in the Table 1 is that a greater than 50% reduction of chlorine can be achieved in the chlorine-containing products with the greatest reduction in chlorine coming in Items 6, 5 and 4 respectively. These items were treated with 0.10–2.5 equivalents of sulfur per equivalent of anhydride component at 205° C.–210° C. for 4.5–7.25 hours. However, depending on the chlorine content of the acylating agent and the amount of chlorine reduction sought, the sulfur content of the reaction mixture may be widely varied. Comparing item 6 with item 5, it can be seen that an increase in sulfur/anhydride leads to lower Cl content of the resultant products. The sulfur content of the treated products ranged from about 1.3–3.2 weight percent based on the weight of the products with Item 3 being very high.

The 100° C. kinematic viscosity of the substituted acylating agents treated with sulfur at over 200° C. with two equivalents of sulfur per equivalent of anhydride shows a marked increase over the non-sulfurized starting materials. Dispersants made from these sulfurized substituted acylating agents should thus have viscosity improving as well as dispersant properties.

In addition to the reduction of chlorine content of polyalkylene substituted acylating agents by sulfur, other methods may be used to further reduce the chlorine content. Such methods were summarized hereinabove using sulfur or sulfur and Lewis acid combined to treat various substituted acylating agents. The reaction products of Example 1. above may also be treated with iodine prior to treatment with sulfur, or Example 1. products may be treated with sulfur and a Lewis acid simultaneously, or iodine treated products of Example 1. above may be treated with sulfur and a Lewis acid simultaneously or an iodine Lewis acid treatment may be made prior to sulfur. The preferred Lewis acid is zinc (II) acetate ·2H$_2$O. The results of some of these treatments is given in Table 2.

EXAMPLE 2

Lewis Acid, Iodine and Sulfur Treatments of Chlorine-Containing Substituted Acylating Agents (A.) Substituted chlorine-containing acylating agents from Example 1. were treated with sulfur as in Example 1.(C) and included in the sulfur treatment was 0.02 weight percent, based on the weight percent of the products from Example 1., of zinc (II) acetate ·2H$_2$O.

(B.) Substituted chlorine-containing acylating agents from Example 1. were treated with iodine to reduce chlorine. In the iodine reaction, 1000 grams of the products of Example 1. were heated to 150° C. and 2–5 grams iodine added. The reaction mixture is heated at about 150° C. for two hours. After two hours, the temperature is raised to 205° C. and the reaction mixture is nitrogen stripped under agitation until the halogen content is 1000 ppm or less (approximately 24 hours). The nitrogen flow is 40 SCFM.

(C.) The reaction products from 2(B) above were treated with 0.02 weight percent zinc (II) acetate ·2H$_2$O and sulfur for time periods of 3.5–6 hours at 205°–210° C.

TABLE 2

Analytical Data for Sulfurization of the products of Example 1, in the presence of zinc (II) acetate.2H$_2$O.

| Item | 1 | 2 | 3 |
|---|---|---|---|
| Prep Number | 1(A) | 1(A) | 1(A) |
| Treatment | | 2 S/anhydride | 2 S/anhydride |
| Process | | 210° C., 4.5 h 0.02% Zn(OAc)2 | 190° C., 6 h 0.02% Zn(OAc)2 |
| TAN | 60.1 | 55.57 | 54.35 |
| D445_100° C. Kinematic Visc (cSt) | 1280 | 1475.37 | 1441.78 |
| D1552 % S | ns | 1.34 | 1.37 |
| AgNO$_3$ % Cl | 0.82 | 0.139 | 0.132 |

The results presented in Table 2 demonstrate a Lewis acid in conjunction with sulfur reduce the chlorine content of the substituted acylating agents even further than the treatment with sulfur alone as can be seen by a comparison of Items 2 and 3 in Table 2 with Items 4 and 7 of Table 1. In another treatment to reduce chlorine, the reaction products from Examples 1(A) and 1(B) were first treated with 0.2–0.5 weight percent iodine to displace chlorine, and the iodine treated reaction products were then treated as in various ways with sulfur and zinc acetate and combinations thereof.

Table 3. below gives analytical data for sulfur treatment of the chlorine-reduced substituted acylating agent from Example 2.(B) where chlorine reduction is effected by iodine treatment.

TABLE 3

Analytical Data for Sulfurization of Iodine Treated Products of Example 2.(b).

| Item | 1 | 2 | 3 |
|---|---|---|---|
| Prep Number | 2(B) | 2(B) | 2(B) |
| Treatment | | 1.8 S/anhydride | 1.8 S/anhydride |
| Process | | 210° C., 6 H | 190° C., 6 H |
| TAN | 56.59 | 54.36 | 55.17 |
| D445_100° C. Kinematic Visc cSt | 463.7 | 1175 | 1002 |
| XRF % I | 0.0372 | not det'd | 0.0007 |
| $AgNO_3$ % Cl | 0.05 | 0.034 | 0.022 |
| % halogen red'n | | 61 | 74 |

As described hereinabove, it was found that sulfur treatment of the reaction products of a polyalkylene with an α-β unsaturated compound in the presence of chlorine resulted in the dehydrogenition of polyalkylene substituted tetrahydrophthalic to give the substituted phthalic acylating agent. We have found that a dehydrogenation reaction also occurs by reacting iodine with the tetrahydrophthalic compounds. The reaction conditions are given above in Table 3. The initial reaction products of the chlorine catalyzed polyalkylene condensation reaction with maleic anhydride result in products with little or no phthalic content. Following treatment with $I_2$, up to 19 percent of the carbonyl peaks in the $^{13}C$ NMR are attributed to phthalic anhydride rings. Table 4. gives analytical data for reduction of chlorine in an iodine treated chlorine-containing substituted acylating agents by various treatments with zinc (II) acetate ·$2H_2O$, and sulfur combinations and sequences.

TABLE 4

Analytical Data for Treated With Combination of Iodine, Zn(OAc).$2H_2O$, and Sulfur.

| Item | 1 | 2 | 3 | 4 |
|---|---|---|---|---|
| Prep # | 1(B) | 1(B) | 1(B) | 1(B) |
| Initial treatment | $I_2$, 6 h | $I_2$, 3.5 h | $I_2$, 3.5 h | $I_2$, Zn(II), 3.5 h |
| Secondary treatment | none | 0.2 S/CO, 3 h | 0.2 S/CO, Zn(II), 3 h | 0.2 S/CO, 3 h |
| D445_100° C. Kinematic Visc. cSt | 4950 | 5400 | 4904 | 4520 |
| $AgNO_3$ % Cl | 0.156 | 0.137 | 0.171 | 0.071 |
| XRF % Cl | 0.1585 | 0.1326 | 0.1128 | 0.0684 |
| XRF % I | 0.0243 | 0.0165 | 0.0238 | 0.0242 |
| XRF halogen | 0.1828 | 0.1491 | 0.1366 | 0.0926 |

Examples shown in Table 4. start with an iodine-treated chlorine-containing substituted acylating agent from Examples 1(A) and 1(B) which were treated with iodine, zinc (II) acetate ·$2H_2O$ and sulfur in various combinations. The data demonstrates that a chlorine (halogen) reduction results.

In the examples and text above, several methods of analysis for various parameters are given. D445 and D1522 are ASTM standard tests for 100° C. kinematic viscosity in centistroke units and weight percent sulfur in a sample respectively. Tests identified as $AgNO_3$ and XRF are for chlorine and chlorine and iodine respectively. In test $AgNO_3$ for chlorine, a sensitivity limit of about 200 ppm chlorine prevails. In this test, the chlorine-containing sample is combusted with a Parr oxygen bomb. Following combustion, the residue is worked up with water which is diluted with an equal volume of isopropyl alcohol and one drop concentrated $HNO_3$ and cooled to about 5° C. The cooled solution is titrated with N/100 $AgNO_3$ standardized solution against a chloride specific electrode.

Test XRF is a wavelength dispersive x-ray fluorescence analysis for chlorine in the range of 0–0.75 mass percent and iodine in the range of 0–0.5 mass percent. In this test, a sample is placed in the x-ray beam and the intensity of the appropriate fluorescence lines of chlorine and iodine are measured. The concentration of the elements are determined from a calibration curve. An x-ray spectrometer such as an ARL-Eisons WDXRF 8410 equipped for soft x-ray detection is used in this test. The spectrometer must also include GEIII and LiF 200 analyzing crystals for use in analyzing chlorine and iodine respectively.

Further in the tables above, TAN refers to total acid number and SAP to saponification number. These are values whose determinations are well known to those in the lubricant arts.

By the reaction of sulfur with the substituted succinic acylating agents or tetrahydrophthalic components the more thermally stable substituted phthalic component results. The thermal stability of the sulfur treated material is exhibited by thermogravimatic analysis (TGA) For TGA 10–20 mg. of samples were heated under $N_2$ to about 700° C. at a heat rate of 10° C./minute.

Under identical experimental conditions, the sulfur treated substituted acylating reaction products lost significantly less weight, over a wide temperature range, than the untreated reaction products. The significance of this result is that derivatives of the substituted phthalic acylating agents, such as dispersants, esters, metal and amine salts and so on will also show greater thermal stability than those derived from the corresponding tetrahydro counter parts. This will result in more thermally stable lubricating and function fluids by virtue of the incorporation of more thermally stable components therein. It is reasoned that thermal stability for the sulfurized acylating agents and derivatives thereof is greater because the phthalic components are less susceptible to retro Diels-Alder reactions than their tetrahydro analogues.

As has been illustrated and described above, substituted carboxylic acylating agents with reduced chlorine content may be made through sulfurization of chlorine-containing acylating agent prepared by reaction of chlorine, polyalkylene component, and maleic acid and/or anhydride component.

In addition, the chlorine-containing sulfurization products contain new compositions of matter defined herein above as chlorine-containing substituted phthalic components, and chlorine-containing bicylic or disuccinic components and, if sulfurization is not carried to completion, chlorine-containing substituted tetrahydrophthalic components.

The major use of the low chlorine substituted acylating agent reaction products of this invention is to react said products with other compounds to form new materials. Such materials are added to lubricating fluids to improve the desired qualities and properties of the lubricating fluids. As used herein, the term lubricating fluids comprises fluids for use as lubricants and greases and fluids which are functional and fluids which are both. Examples of lubricating fluids are engine oils, gear lubricants, manual transmission fluids and the like.

A functional fluid is a term which encompasses a variety of fluids including but not limited to tractor fluids, automatic transmission fluids, manual transmission fluids, hydraulic fluids, power steering fluids, fluids related to power train components and fluids which have the ability to act in various different capacities. The materials may also be used as additives to fuel compositions.

As used hereinafter, the term lubricating composition encompasses fluids for lubrication, greases, and fluids with functional properties as well as fuels. Also as used hereinafter, the low chlorine substituted carboxylic acylating agents which have been formed by sulfurizing the chlorine-containing substituted carboxylic acylating agents formed by reacting a polyalkylene and maleic anhydride in the presence of chlorine will be identified as acylating agents.

The acylating agents of this invention have utility, in and of themselves, as additives for lubricant and fuel compositions in the same manner as the known high molecular weight carboxylic acid acylating agents of the prior art. For example, the acylating agents of this invention which are succinic acids, succinic acid anhydrides, and lower alkyl esters of succinic acids can be used as fuel additives to reduce deposit formations when used in concentrations of about 50 to about 1000 ppm in hydrocarbon-based fuels boiling substantially in the range of 100° to 750° F. U.S. Pat. No. 3,346,354 is expressly incorporated herein by reference for instructions for using the known high molecular weight carboxylic acid acylating agents since those instructions are applicable to the acylating agents of this invention; Similarly, U.S. Pat. No. 3,288,714 is expressly incorporated herein by reference for its teachings of how to use known high molecular weight carboxylic acid acylating agents which are succinic anhydrides as additives in lubricant compositions where they function as dispersant/detergents since these teachings are applicable to the acylating agents of this invention.

For the same reason, U.S. Pat. No. 3,714,042 is expressly incorporated herein by reference for its teachings with respect to how to use the acylating agents of this invention to treat overbased complexes. Thus, the acylating agents of this invention containing succinic acid groups, succinic anhydride groups, and succinic ester groups can be used to treat basic metal sulfonate complexes, sulfonatecarboxylate complexes, and carboxylate complexes in the same manner and according to the same procedure as described in U.S. Pat. No. 3,714,042 by replacing the high molecular weight carboxylic acid acylating agents discussed therein with the acylating agents of this invention on an equivalent weight basis.

Because the acylating agents of this invention have utility in and of themselves, beyond that of being intermediates for preparing other novel compositions, lubricant compositions and concentrates containing the acylating agents, as mentioned hereinbefore and described more fully hereafter constitute a part of this invention.

The major compounds with which the low chlorine substituted acylating agents of this invention are reacted are those presented in U.S. Pat. Nos. 4,234,435, 5,041,622 and 5,230,714 which are incorporated herein by reference in their entirety.

The principle use of the acylating agents of this invention is as intermediates in processes for preparing carboxylic derivative compositions comprising reacting one or more acylating agents with a reactant selected from the group consisting of (a) amine characterized by the presence within its structure of at least one HN< group, (b) alcohol, (c) reactive metal or reactive metal compound, and (d) a combination of two or more of (a) through (c), the components of (d) being reacted with said acylating agents simultaneously or sequentially in any order. Reaction conditions for condensing the chlorine containing substituted acylating agents of this invention with compounds of (a)–(d) above are given in U.S. Pat. No. 4,234,435 which has been incorporated herein by reference.

The amine, (that is, (a) above) characterized by the presence within its structure of at least one HN< group can be a monoamine or polyamine compound. For purposes of this invention, hydrazine and substituted hydrazines containing up to three substituents are included as amines suitable for preparing carboxylic derivative compositions. Mixtures of two or more amines can be used in the reaction with one or more acylating agents of this invention. Preferably, the amine contains at least one primary amino group (i.e., —NH$_2$) and more preferably the amine is a polyamine, especially a polyamine containing at least two HN< groups, either or both of which are primary or secondary amines. The polyamines not only result in carboxylic acid derivative compositions which are usually more effective as dispersant/detergent additives, relative to derivative compositions derived from monoamines, but these preferred polyamines result in carboxylic derivative compositions which exhibit more pronounced viscosity improving properties.

Alcohols which can be used as (b) include the monohydric and polyhydric alcohols. Again, the polyhydric alcohols are preferred since they usually result in carboxylic derivative compositions which are more effective dispersant/detergents relative to carboxylic derivative compositions derived from monohydric alcohols. Further, the carboxylic acid derivative compositions derived from polyhydric alcohols exhibit very pronounced viscosity improving properties and are especially preferred reactants.

Reactive metals and reactive metal compounds useful as (c) are those which are known to form salts and complexes when reacted with carboxylic acid and carboxylic acid acylating agents.

Detailed disclosure of the reactions of (a), (b), (c) and (d) above with various acylating agents as well as the compounds defined under (a), (b) and (c) above are given in U.S. Pat. No. 4,234,435, 5,041,622 and 5,230,714.

Of the carboxylic derivative compositions described hereinabove, those prepared from novel acylating agents and the alkylene polyamines, especially polyethylene polyamines, and/or polyhydric alcohols, especially the polyhydric alkanols, are especially preferred. As previously stated, mixtures of polyamines and/or polyhydric alcohols are contemplated. Normally, all the carboxyl functions on the acylating agents of this invention will either be esterified or involved in formation of an amine salt, amide, imide or imidazoline in this preferred group of carboxylic derivative compositions.

In order to achieve the requisite degree of viscosity improving capabilities in the carboxylic derivative compositions of this invention, it has been found necessary to react the acylating agents of this invention with polyfunctional reactants. For example, polyamines having two or more primary and/or secondary amino groups, polyhydric alcohols, amino alcohols in which there are one or more primary and/or secondary amino groups and one or more hydroxy groups, and polyvalent metal or polyvalent metal compounds. It is believed that the polyfunctional reactants serve to provide "bridges" or crosslinking in the carboxylic derivative compositions and this, in turn, is somehow responsible for the viscosity improving properties. However, the mechanism by which viscosity improving properties is obtained is not understood and applicants do not intend to be bound by this theory. Since the carboxylic derivative compositions derived, in whole or in part, from polyhydric alcohols appear to be particularly effective in permitting a reduction of the amount of viscosity improver in lubricating compositions, the polyfunctionality of reactants (a), (b) and (c) may not fully explain the viscosity improving properties of the carboxylic derivative compositions.

Obviously, however, it is not necessary that all of the amine, alcohol, reactive metal, or reactive metal compound reacted with the acylating agents be polyfunctional. Thus, combinations of mono- and polyfunctional amines, alcohols, reactive metals and reactive metal compounds can be used; for example, monoamine with a polyhydric alcohol, a monohydric alcohol with polyamine, an amino alcohol with a reactive metal compound in which the metal is monovalent, and the like.

While the parameters have not been fully determined as yet, it is believed that acylating agents of this invention should be reacted with amines, alcohols, reactive metals, reactive metal compounds, or mixtures of these which contain sufficient polyfunctional reactant, (e.g. polyamine, polyhydric alcohol) so that at least about 25% of the total number of carboxyl groups (from the succinic groups or from the groups derived from the maleic reactant) are reacted with a polyfunctional reactant. Better results, insofar as the viscosity improving facilities of the carboxylic derivative compositions is concerned, appear to be obtained when at least 50% of the carboxyl groups are involved in reaction with such polyfunctional reactants. In most instances, the best viscosity improving properties seem to be achieved when the acylating agents of this invention are reacted with a sufficient amount of polyamine and/or polyhydric alcohol (or amino alcohol) to react with at least about 75% of the carboxyl group. It should be understood that the foregoing percentages are "theoretical" in the sense that it is not required that the stated percentage of carboxyl functions actually react with polyfunctional reactant. Rather these percentages are used to characterize the amounts of polyfunctional reactants desirably "available" to react with the acylating agents in order to achieve the desired viscosity improving properties.

Another aspect of this invention involves the post-treatment of the carboxylic derivative compositions as described in U.S. Pat. No. 4,234,435. Experimental conditions and examples of post-treatment are as described in U.S. Pat. No. 4,234,435. Acylated nitrogen, and hydroxy compositions, prepared by reacting the acylating agents of this invention with amines and alcohols as described above are post-treated by contacting the acylated compositions thus formed (e.g., the carboxylic derivative compositions) with one or more post-treating agents selected from the group consisting of boron oxide, boron oxide hydrate, boron halides, boron acids, esters of boron acids, carbon disulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols. The same post-treating agents are used with carboxylic derivative compositions prepared from the acylating agents of this invention and a combination of amines and alcohols as described above. However, when the carboxylic derivative compositions of this invention are derived from alcohols and the acylating agents, that is, when they are acidic or neutral esters, the post-treating agents are usually selected from the group consisting of boron oxide, boron oxide hydrate, boron halides, boron acids, esters of boron acids, sulfur, sulfur chlorides, phosphorus sulfides, phosphorus oxides, carboxylic acid acylating agents, epoxides, and episulfides.

Since post-treating processes involving the use of these post-treating agents is known insofar as application to reaction products of high molecular weight carboxylic acid acylating agents of the prior art and amines and/or alcohols, detailed descriptions of these processes herein is unnecessary. In order to apply the prior art processes to the carboxylic derivative compositions of this invention, all that is necessary is that reaction conditions, ratio of reactants, and the like as described in the prior art, be applied to the novel carboxylic derivative compositions of this invention. The following U.S. patents are expressly incorporated herein by reference for their disclosure of post-treating processes and post-treating agents applicable to the carboxylic derivative compositions of this invention: U.S. Pat. Nos. 3,087,936; 3,200,107; 3,252,908; 3,254,025; 3,256,185; 3,278,550; 3,281,357; 3,281,428; 3,282,955; 3,284,409; 3,284,410; 3,306,908; 3,325,567; 3,338,832; 3,344,069; 3,346,493; 3,366,569; 3,367,943; 3,373,111; 3,403,102; 3,428,561; 3,502,677; 3,513,093; 3,515,669; 3,519,564; 3,533,945; 3,541,012; 3,558,743; 3,579,450; 3,632,511; 3,708,522; 3,759,830; 3,859,318; 3,865,813; 4,034,038; 4,136,043; 4,140,643; 4,234,435; 4,491,527; 4,695,390; 4,780,011; 4,857,214; 5,256,324; (use of acidified clays in post-treating carboxylic derivative compositions derived from the acylating agents of this invention and amines); 3,184,411; 3,185, 645; 3,185,704; 3,245,908; 3,245,909; 3,245,910; 3,280, 034; 3,312,619; 3,367,943; 3,369,021; 3,390,086; 3,415, 750; 3,458,530; 3,470,098; 3,551,466; 3,558,743; 3,573, 205; 3,639,242; 3,652,616; 3,692,681; 3,708,522; 3,718, 663; 3,749,695; 3,859,318; 3,865,740; 3,865,813; 3,954, 639; UK Pat. No. 1,085,903; UK Pat. No. 1,162,436. The processes of these incorporated patents, as applied to the carboxylic derivative compositions of this invention, and the post-treated carboxylic derivative compositions thus produced constitute a further aspect of this invention.

As previously indicated, the acylating agents, the carboxylic derivative compositions, and the post-treated carboxylic derivative compositions of this invention are useful as additives in lubricating oils. From the foregoing description, it is seen that the acylating agents, the carboxylic derivative compositions, and the post-treated carboxylic derivative compositions, especially the latter two, function primarily as dispersant/detergents and Viscosity improvers.

The lubricant compositions of this invention include lubricating oils and greases although, for the most part they will be lubricating oils. The lubricating oil compositions of this invention are based on natural and synthetic lubricating oils and mixtures thereof. These lubricants include crankcase lubricating oils for spark-ignited and compression-ignited internal combustion engines, such as automobile and truck engines, marine and railroad diesel engines, and the like. Automatic transmission fluids, transaxle lubricants, gear lubricants, metal-working lubricants, hydraulic fluids and other lubricating oil and grease compositions can also benefit from the incorporation therein of the acylating agents and carboxylic derivative compositions of the present invention.

The lubricant and functional fluid compositions of the present invention are based on diverse oils of lubricating viscosity, including natural and synthetic lubricating oils and mixtures thereof. The lubricating compositions may be lubricating oils and greases useful in industrial applications and in automotive engines, transmissions and axles. These lubricating compositions are effective in a variety of applications including crankcase lubricating oils for spark-ignited and compression-ignited internal combustion engines, including automobile and truck engines, two-cycle engines, aviation piston engines, marine and low-load diesel engines, and the like. Also, automatic transmission fluids, transaxle lubricants, gear lubricants, metalworking lubricants, hydraulic fluids, and other lubricating oil and grease compositions can benefit from the incorporation of the compositions of this invention.

The lubricants and functional fluid compositions of this invention employ an oil of lubricating viscosity which is generally present in a major amount (i.e. an amount greater than about 50% by weight). Generally, the oil of lubricating viscosity is present in an amount of greater than about 80% by weight of the composition.

The natural oils useful in making the inventive lubricants and functional fluids include animal oils and vegetable oils (e.g., lard oil, castor oil) as well as mineral lubricating oils such as liquid petroleum oils and solvent treated or acid-treated mineral lubricating oils of the paraffinic, naphthenic or mixed paraffinicnaphthenic types which may be further refined by hydrocracking and hydrofinishing processes and are dewaxed. Oils of lubricating viscosity derived from coal or shale are also useful. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkyl-benzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_{3-8}$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl) silicate, hexyl-(4-methyl-2pentoxy) disiloxane, poly(methyl) siloxanes, poly-(methyl-phenyl) siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and re-refined oils, either natural or synthetic (as well as mixtures of two or more of any of these) of the type disclosed hereinabove can be used in the lubricants of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Re-refined oils are obtained by processes similar to those used to obtain refined oils applied to refined oils which have been already used in service. Such re-refined oils are also known as reclaimed or reprocessed oils and often are additionally processed by techniques directed to removal of spent additives and oil breakdown products.

In one embodiment, the oil of lubricating viscosity is a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from 1-decene. These PAOs may have a viscosity from about 2 to about 150.

In use, the various chlorine containing substituted carboxylic acylating agents, carboxylic derivative compositions and post-treated carboxylic derivative compositions are contained as additives in a composition comprising a majority of lubricating oil, functional fluid or fuel. As is well-known in the art, the compositions of this invention are included with several other components in an oil of lubricating viscosity and/or function fluid. The components of this invention when included in a oil of lubricating viscosity provide superior wear properties when used in a (Ford) Sequence VE Engine Test, ASTM D5302-92. Wear values for Sequence VE tests in mils are given below for a series of oil compositions and for an oil composition having a low chlorine content substituted carboxylic acylating agent derivative prepared by reacting the low chlorine containing acylating agent with amine bottoms to form the substituted acylating agent derivative.

TABLE 5

Wear Values in Mils for Sequence VE Test

| Wear | 1. | 2. |
|---|---|---|
| Max | 1.03 | 0.40 |
| Ave. | 0.8 | 0.23 |

The value given in column 1. is for the composition without the composition of this invention. The values in column 1. were selected as the best values available from three base line tests. One can determine that the composition of column 2. is superior to the best values of the base line composition. The only difference between the composition used for columns 1. and 2. is that the succinimide dispersant of the composition of column 2. is that as described in this invention.

The composition used in the Sequence VE tests above are as follows. The components are listed as weight percent based on the weight of the lubricating composition.

TABLE 6

Lubricating Compositions for Use in Sequence VE Wear Tests

| Component | Weight Percent |
|---|---|
| 1. Base oil, 100N HT Ashland, Cattlesburg | 72.2 |
| 2. Base oil, 325N HT Ashland, Cattlesburg | 9.9 |
| 3. Viscosity improver, contains 91.4% Ashland, Cattlesburg 100HT; 0.1% 2,6 di-detertiarybutyl paracresol 8.5% Uniroyal cc-988 copolymer | 8.20 |
| 4. Polymethacrylate pour point depressant | 0.20 |
| 5. Performance package | 9.50 |

The performance package is listed below. The weight percent of each component is based on its weight based on the weight of the lubricating compositions.

TABLE 7

Performance Package

| Component | Weight Percent |
|---|---|
| 1. High molecular weight succinimide dispersant contains 55% dil oil | 4.03 |
| 2. 100N dil oil | 0.86 |
| 3. Succinate dispersant, contains 45% 100N dil oil | 1.37 |
| 4. Zinc dithiophosphate, contains 9% 100N dil oil | 0.92 |
| 5. Nonylated diphylamine, contains 12% 100 N dil oil | 0.68 |
| 6. Sulfurized α-olefins contain 15% 100N dil oil | 0.30 |
| 7. 255 TBN Ca overbased sulfurized dodecyl phenol, contains 39% dil oil | 0.51 |
| 8. 300 TBN Ca overbased sulfonate contains 41% dil oil | 0.38 |
| 9. 300 TBN Na overbased 1000 $M_n$ polyisobutylene substituted acylating agent, contains 40% dil oil | 0.20 |
| 10. 400 TBN Mg overbased sufonate, contains 32% dil oil | 0.25 |
| 11. Silicone antifoaming - Dow | 0.09 |

The difference in the compositions whose wear data are reported above for the Sequence VE wear test is that composition 2. contains a low chlorine containing succinimide dispersant prepared in accordance with this invention. The chlorine containing dispersant is prepared by reacting $M_n$ 2000 polyisobutylene with maleic anhydride in the presence of chlorine to form a chlorine containing substituted acylating agent. The chlorine content of the acylating agent may vary but would normally be in the range of about 0.7–1.5 weight percent. The chlorine content of the chlorine containing acylating agent is then reduced using 0.6 equivalents of sulfur per equivalent of anhydride. This is based on two equivalents of sulfur per equivalent of tetrahydrophthalic anhydride units in the substituted acylating reaction mixture. The sulfur reaction is carried out at 210° C. in the presence of 0.02 weight percent zinc acetate dihydrate for a period of eight hours. The substituted acylating agent has a reduced chlorine content of about 0.12 weight percent based on the weight of the acylating agent.

EXAMPLE 3

High Molecular Weight Succinimide Having Low Chlorine Content

The chlorine containing substituted acylating agent described hereinabove, 4.04 equivalents, 2645.2 grams is heated to 110° C. with about 3.335 L 100N dil oil and 10 drops antifoam agent. To this stirred mixture is added 3.37 equivalents of Union Carbide PM 1969 polyamine mixture containing about 25% diethylenetriamine and 72% amine bottoms. The mixture is held at 110° C. for one hour, when the temperature is increased to 155°–160° C. for 4 hours, cooled to 50° C. The mixture is then heated again to 140° C., filter aid added, 183 grams, and the mixture is filtered. The reaction above is now under a 0.25CFM $N_2$ purge. The chlorine content of the succinimide dispersant—low chlorine content substituted carboxylic acylating derivative—made by the process is about 0.05 weight percent.

For the components listed above in Tables 6. and 7., many of the products are commercially available. The HT base oils are commercially available. The pour point depressant is a polymethacrylate. The viscosity improver, in addition to the oil and di-t-butyl cresol can be Uniroyal cc-988, an olefin copolymer or Uniroyal X-3548, an olefin copolymer.

The high molecular weight dispersants of Table 7. can be made as described hereinabove or as described in U.S. Pat. No. 4,234,435. The succinate dispersant can be made as in Example 13 of the '435 patent which describes the reaction of a polyisobutylene succinic acylating agent and pentaerythritol (an alcohol) and ethylene polyamines.

Zinc dithiophosphate and nonylated diphenyl amine may be purchased as is well-known to those skilled in the art. The sulfurized olefins are $C_{15}$–$C_{18}$ olefins reacted with $S_2Cl_2$ and then with $Na_2S$. Sulfurization reactions may be found in U.S. Pat. Nos. 2,708,199; 3,471,404; 4,191,659; 3,498,915 and 4,582,618 which are incorporated herein by reference for disclosure of sulfurization reactions.

The calcium overbased sulfurized docecylphenol as listed above is described in U.S. Pat. No. 5,328,620 which is incorporated herein by reference for its disclosure of overbased sulfurized phenols. The phenol composition as used above contains about 5 weight percent $M_n$ 1000 polyisobutylene substituted acylating agent and about 3 weight percent on a chemical basis of an overbased calcium sulfonate having TBN 30. The latter two additives to the sulfirized overbased phenol aid in compatibility.

The calcium overbased sulfonate having 300 TBN is a well-known type of detergent to those skilled in the art. The overbased calcium salt is a mixture containing roughly 40% dil oil and 3.5 weight percent of 1000 $M_n$ polyisobutylene substituted acylating agent and 2.5 weight percent of the calcium salt of a formaldehyde coupled phenol mixture. The latter contains 69% dil oil.

The sodium overbased carboxylate is a 1000 $M_n$ polyisobutylene substituted acylating agent having TBN of 300. This type of compound is described in U.S. Pat. No. 5,449,470 which is incorporated herein by reference for compounds of this type. The specific 300 TBN of this example also contains 2 weight percent dodecylphenol.

The magnesium overbased sulfonate with 400 TBN is well known to those skilled in the art. The particular magnesium salt used above has 32 weight percent dil oil and contains 5 weight percent 1000 $M_n$ polyisobutylene substituted acylating agent which aids compatibility of this component.

It will be recognized by those skilled in the art, the compositions of this invention, while useful in themselves, are also useful in oils for lubrication, fuels, greases, hydraulic fluids and the like either alone or in mixtures with other additives.

Generally the lubricants of the present invention contain a lubricating improving amount of one or more of the compositions of this invention, e.g., sufficient to provide it with improved detergent/dispersant and/or viscosity properties. Normally, the amount employed will be about 0.05% to about 20%, preferably about 0.1% to about 10% of the total weight of the lubricating composition. This amount is exclusive of solvent/diluent medium. In lubricating compositions operated under extremely adverse conditions, such as lubricating compositions for marine diesel engines, the metal salts of this invention may be present in amounts of up to about 30% by weight or more, of the total weight of the lubricating composition.

The invention also contemplates the use of other additives in combination with the compositions of this invention. Such additives include, for example, detergents and dispersants of the ash-producing or ashless type, corrosion- and oxidation-inhibiting agents, pour point depressing agents, extreme pressure agents, antiwear agents, color stabilizers and antifoam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium potassium, lithium, calcium, magnesium, strontium and barium.

The purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Antifoam agents are used to reduce or prevent the formation of stable foam. Typical antifoam agents include silicones or organic polymers. Additional antifoam compositions are described in "Foam Control Agents", by Henry T. Kerner (Noyes Data Corporation, 1976), pages 125–162.

The compositions of this invention can be added directly to the fuels or lubricants. Preferably, however, they are diluted with a substantially inert, normally liquid organic diluent such as mineral oil, naphtha, benzene, toluene or xylene, to form an additive concentrate. These concentrates usually contain from about 10% to 80% by weight of the composition of this invention, and 20% to 90% by weight of the inert diluents. The concentrates also may contain one or more other additives known in the art or described hereinabove.

What is claimed is:

1. A sulfur containing polyalkylene substituted carboxylic acylating agent composition having reduced halogen content, said composition comprising reaction products formed by reacting:

(A.) halogen containing substituted carboxylic acylating agent composition reaction products formed by reacting chlorine and/or bromine with $M_n$ 140–10,000 polyalkylene derived from $C_2$–$C_{16}$ olefins and maleic anhydride to produce said halogen containing reaction products; with (B.) a component selected from the group consisting of:
   (a) sulfur;
   (b) organic sulfur donors;
   (c) sulfur and a Lewis acid in any order;
   (d) sulfur and a mineral acid in any order;

wherein said sulfur containing reduced halogen composition is produced; said sulfur containing composition having increased viscosity values at 100° C. when compared to the viscosity values for those of (A.) composition.

2. A composition according to claim 1, said composition further comprising iodine containing polyalkylene substituted carboxylic acylating agents having reduced halogen content, said composition comprising reaction products formed by reacting:

(A.) iodine containing reaction products formed by reacting said composition of 1(A.) with a component selected from the group consisting of:
   (a) iodine;
   (b) iodine and a Lewis acid in any order;
   (c) iodine and a mineral acid in any order; to produce said iodine containing reaction products; with (B.) a component of 1(B);

whereby said iodine containing reduced halogen composition is produced.

3. A composition according to claim 1 or 2, wherein said reaction products from 1(A.) comprise halogen containing polyalkylene substituted succinic anhydrides; polyalkylene substituted tetrahydrophthalic anhydrides; and polyalkylene substituted disuccinic anhydrides and wherein said tetrahydrophthalic components are converted to their phthalic analogs in 1(B.).

4. A composition according to claim 1, wherein said polyalkylene is polyisobutylene.

5. A composition according to claims 1 or 2, wherein said halogen content of said reaction products of 1(A.) is greater than said halogen content of reaction products of 1(B.), 2(A.), and 2(B.) as determined by weight percent halogen in said reaction products.

6. A composition of matter according to claim 1, wherein said halogen content of said reaction products of 1(A.) is about 2 weight percent or less based on the weight of said reaction products of 1(A.).

7. A composition of matter according to claims 1 or 2, wherein said halogen content of said reaction products of 1(B.), 2(A.), and 2(B.) is about 0.5 weight percent or less based on the weight of said reaction products.

8. A composition of matter according to claim 7, wherein said halogen content is less than about 0.15 weight percent.

9. A composition according to claim 1 or 2, wherein said 1(B.) and 2(B.) reaction products contain about 3 weight percent or less sulfur based on the weight of said reaction products of 1(B.) and 2(B.).

10. A composition according to claim 1 or 2, wherein said halogen is chlorine.

11. A composition according to claim 1 or 2, wherein said component selected is sulfur.

12. A composition according to claim 1, wherein the reaction products of 1(B.) are more thermally stable than reaction products of 1(A.) as determined by TGA.

13. A composition of matter according to claims 1 and 2 having reduced halogen content, said composition comprising:

reaction products prepared by reacting a component selected from the group consisting of:

(A) reduced halogen composition of 1(B.);

(B) iodine containing reduced halogen composition of 2(B.);

or mixtures thereof with a reactant selected from the group consisting of:
(a) amine characterized by the presence within its structure of at least one H—N< group;
(b) an alcohol;
(c) a reactive metal or reactive metal compound;
(d) a mixture of two or more components of (a)–(c)
wherein the components of (d) are reacted with said reduced halogen compositions; simultaneously or sequentially in any order.

14. A composition according to claim 13, wherein said halogen is chlorine.

15. A composition according to claim 14, wherein said composition further comprises sulfur.

16. A composition of matter having reduced halogen content, said composition comprising:

reaction products prepared by post reacting the reaction products of claim 13 with a reagent selected from the group consisting of:
(1) boron containing agents;
(2) sulfur containing agents including dimercaptothiadiazole and derivatives thereof;
(3) phosphorus containing agents;
(4) nitrogen containing agents;
(5) metal containing agents;
(6) carboxylate containing agents;
and mixtures thereof.

17. A method of making reduced chlorine content polyalkylene substituted phthalic anhydrides of formulas:

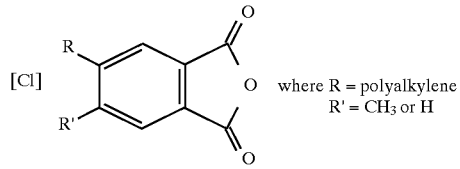

said method comprising reacting a $M_n$ 140–10,000 chlorine containing polyalkylene substituted tetrahydro phthalic anhydride with a compound selected from the group consisting of:
(a) sulfur;
(b) iodine;
(c) iodine and sulfur in any order.

18. The compounds formed by the method of claim 17.

19. A composition of matter comprising a fluid selected from the group consisting of:
(A) metalworking fluids;
(B) hydraulic fluids;
(C) transmission fluids;
and incorporated therein a composition selected from the group consisting of the products from claims 1, 2, 13, 16 or 18.

20. A composition of matter comprising a major amount of a component selected from the group consisting of:
(A) oils of lubricating viscosity;
(B) fuels;
(C) greases;
and a minor amount of a composition selected from the group consisting of the products from claims 1, 2, 13, 16 or 18.

* * * * *